United States Patent
Shin

(10) Patent No.: US 12,529,584 B2
(45) Date of Patent: Jan. 20, 2026

(54) FLOW METER FOR A SEWAGE CONDUIT INCLUDING A PLURALITY OF OPPOSING FLUID INDUCTION PORTIONS WITH EMBEDDED ULTRASONIC TRANSDUCERS AND AN EXTERNALLY MOUNTED ULTRASONIC TRANSDUCER IN COMBINATION FOR MEASURING WATER DEPTH WITHIN THE FLOW METER

(71) Applicants: Min-Chul Shin, Seoul (KR); JAIN TECHNOLOGY CO., LTD., Seoul (KR)

(72) Inventor: Min-Chul Shin, Seoul (KR)

(73) Assignee: JAIN TECHNOLOGY DO., LTD. (KR)

( * ) Notice: Subject to any disclaimer, the term of this patent is extended or adjusted under 35 U.S.C. 154(b) by 168 days.

(21) Appl. No.: 17/625,717

(22) PCT Filed: Jan. 20, 2020

(86) PCT No.: PCT/KR2020/000925
§ 371 (c)(1),
(2) Date: Jan. 7, 2022

(87) PCT Pub. No.: WO2021/145494
PCT Pub. Date: Jul. 22, 2021

(65) Prior Publication Data
US 2022/0252441 A1    Aug. 11, 2022

(30) Foreign Application Priority Data
Jan. 17, 2020    (KR) ........................ 10-2020-0006871

(51) Int. Cl.
*G01F 1/66* (2022.01)
*G01F 1/002* (2022.01)
(Continued)

(52) U.S. Cl.
CPC .............. *G01F 1/662* (2013.01); *G01F 1/667* (2013.01); *G01F 23/296* (2013.01); *G01F 1/002* (2013.01)

(58) Field of Classification Search
CPC .......... G01F 1/662; G01F 1/667; G01F 1/002; G01F 23/296
See application file for complete search history.

(56) References Cited

U.S. PATENT DOCUMENTS

2013/0080081 A1* 3/2013 Dugger ................. G01F 15/063
                                                                73/861.25

FOREIGN PATENT DOCUMENTS

KR      20020021558 A  *  3/2002  ............... G06F 1/66
KR      20060010861 A  *  2/2006  ............. G01F 1/663
(Continued)

OTHER PUBLICATIONS

Machine Translation of KR1020170109506 provided by Espacenet (Year: 2017).*

*Primary Examiner* — Jonathan M Dunlap
(74) *Attorney, Agent, or Firm* — Sherman D. Pernia

(57) ABSTRACT

A flow meter for a sewage conduit according to the present invention includes a first body portion comprising a plurality of sets of fluid induction portions that protrude along an inner circumferential surface in parallel in a flow direction, and a pair of ultrasonic transducers that are embedded in protruding sides end of the fluid induction portions; a second body portion, which is a portion exposed to the outside of the sewage conduit comprising an opening portion that is cut and formed to have a predetermined angle from an upper end and formed by extending the fluid induction portions formed in the first body portion; and a water level measurement sensor unit which is fixed in the manhole on the outside of the sewage conduit, emits ultrasonic waves toward the (Continued)

opening portion of the second body portion, and measures the water level.

2 Claims, 4 Drawing Sheets

(51) Int. Cl.
    *G01F 1/667*     (2022.01)
    *G01F 23/296*     (2022.01)

(56) References Cited

FOREIGN PATENT DOCUMENTS

| | | | | | |
|---|---|---|---|---|---|
| KR | 20100001900 | A | * | 1/2010 | ............. E03B 7/072 |
| KR | 101657264 | B1 | * | 9/2016 | |
| KR | 20170109506 | A | * | 9/2017 | ............. G01F 1/662 |
| KR | 102037873 | B1 | * | 10/2019 | ............. G01D 21/02 |

* cited by examiner

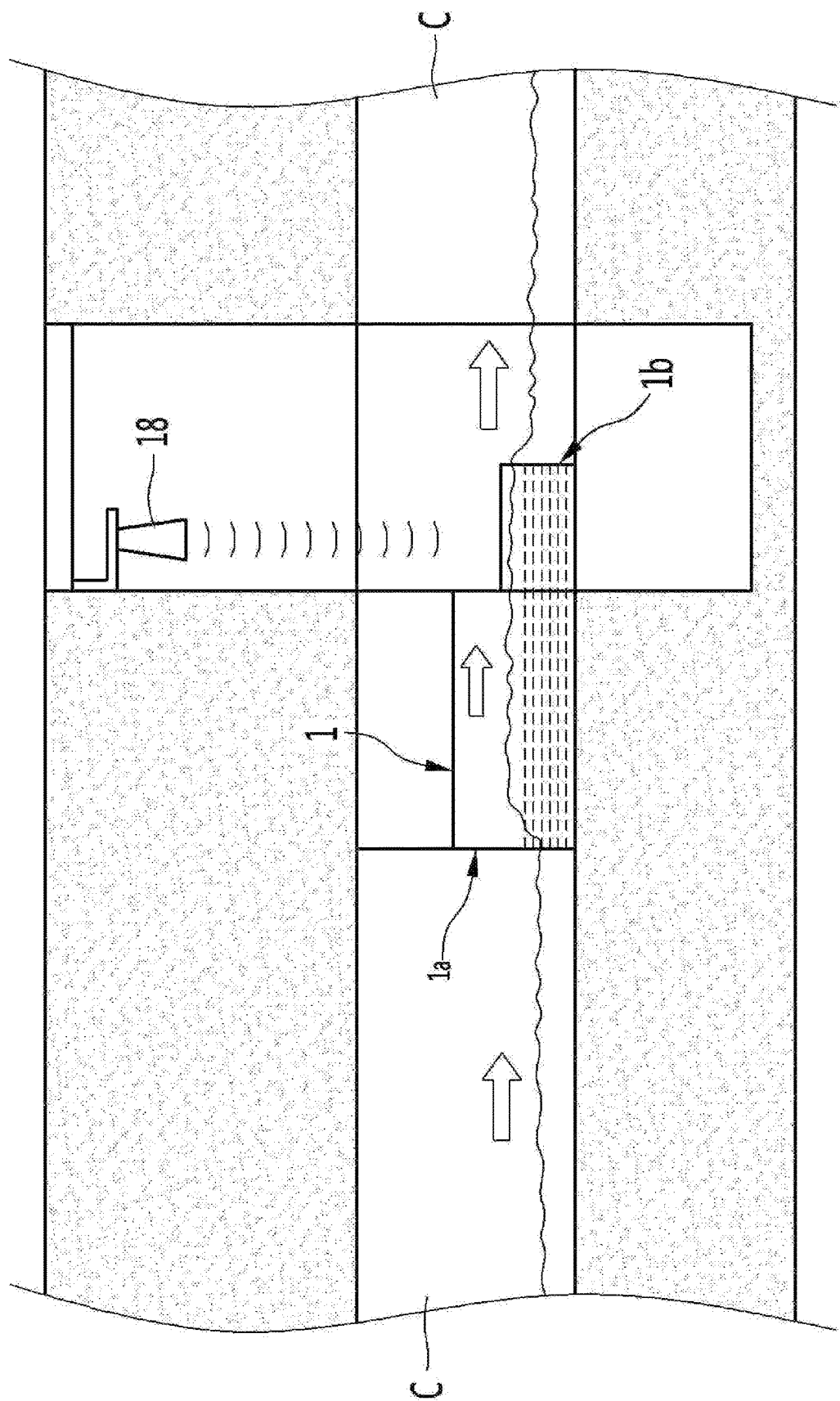

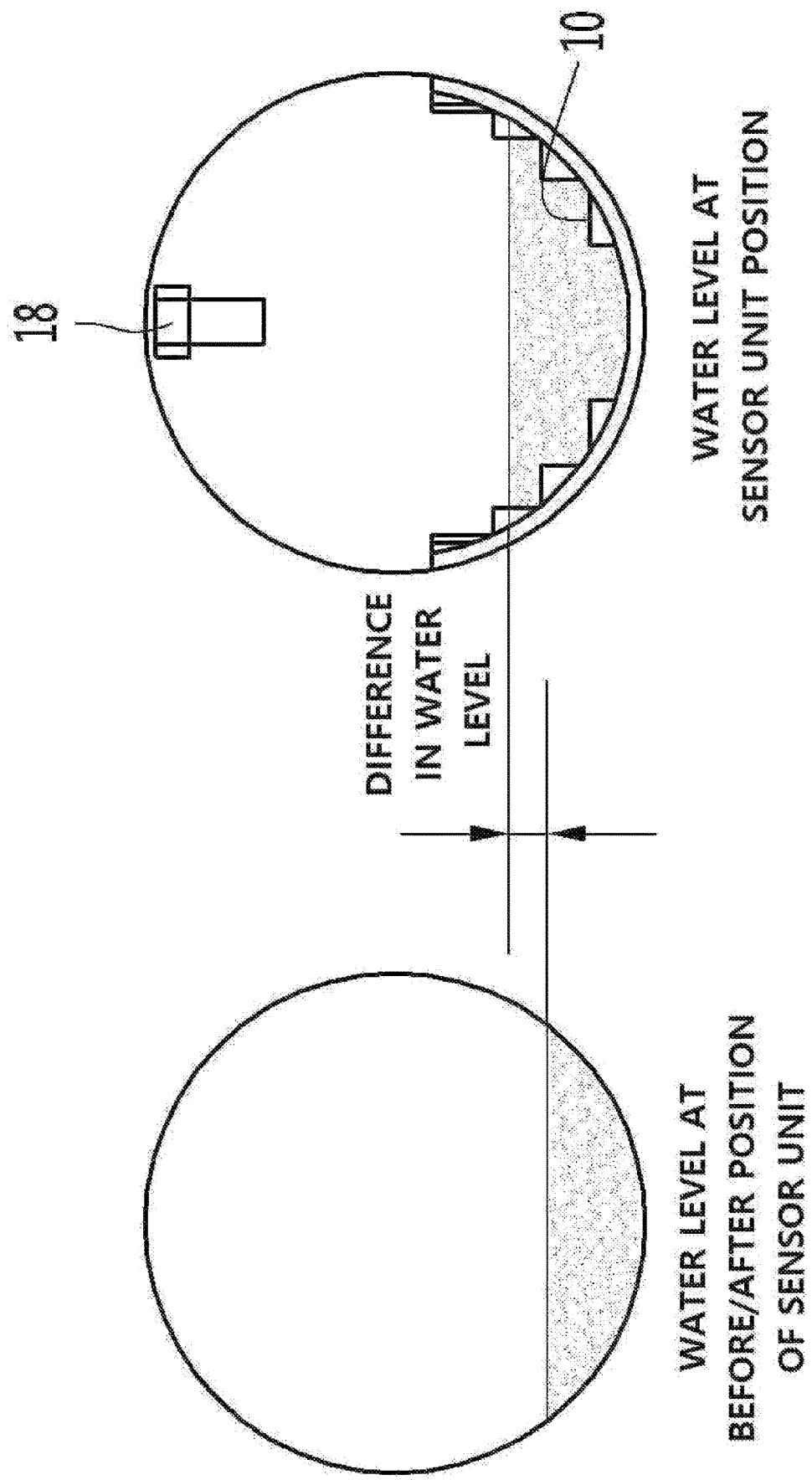

FLOW METER FOR A SEWAGE CONDUIT INCLUDING A PLURALITY OF OPPOSING FLUID INDUCTION PORTIONS WITH EMBEDDED ULTRASONIC TRANSDUCERS AND AN EXTERNALLY MOUNTED ULTRASONIC TRANSDUCER IN COMBINATION FOR MEASURING WATER DEPTH WITHIN THE FLOW METER

BACKGROUND OF THE INVENTION

Field of the Invention

The present invention relates to a flow meter, and more particularly, to a flow meter suitable for a small sewage conduit that usually maintains a non-full conduit state rather than a full conduit.

Background of the Related Art

Korea Patent Registration No. 10-1833543 published on Mar. 2, 2018 discloses a non-full conduit sewage flow meter that conforms to low carbon. According to the registered patent, a plurality of sets of fluid induction portions that are formed to face each other at regular intervals from the lowest water depth close to a bottom surface of the sewage conduit to less than the highest water depth and protrude along the inner circumferential surface in parallel in a flow direction are provided, so that it is possible to measure the exact actual sewage flow for sewage treatment by precisely and accurately measuring the actual flow even in a sewage conduit in which only a very small flow flows during the dry season due to a low amount of precipitation, and, in the conventional method, the possibility of measurement errors due to the accumulation of sand or slurry is reduced, and damage to a sensor due to stones in flowing water is reduced.

However, there is a problem that it is impossible to apply the above-described non-full conduit sewage flow meter to a small sewage conduit where it is difficult to embed a water level measurement sensor together due to space constraints.

SUMMARY OF THE INVENTION

Accordingly, the present invention has been made in view of the above-mentioned problems occurring in the prior art, and it is an object of the present invention to provide a flow meter for a sewage conduit that is improved so that a water level measurement error does not occur due to a difference in cross-sectional area in a flow direction in a small flow meter for a sewage conduit including a plurality of sets of fluid induction portions that are formed to face each other at regular intervals from the lowest water depth close to a bottom surface of the sewage conduit to less than the highest water depth and protrude along an inner circumferential surface in parallel in the flow direction.

To accomplish the above-mentioned objects, according to a first aspect of the present invention, there is provided a flow meter for a sewage conduit including a first body portion, which is a portion inserted into the sewage conduit, comprising a plurality of sets of fluid induction portions that are formed to face each other at regular intervals from a lowest water depth close to a bottom surface of the sewage conduit to less than a highest water depth and protrude along an inner circumferential surface in parallel in a flow direction, and a pair of ultrasonic transducers that are embedded in protruding sides end of the fluid induction portions, designed in a V method so that ultrasonic waves emitted from one ultrasonic transducer are reflected by the fluid induction portions facing each other and reach the other ultrasonic transducer, and configured to increase a separation distance from a low water depth to a high water depth; a second body portion, which is a portion exposed to the outside of the sewage conduit by extending toward a manhole from the first body portion inserted into the sewage conduit, comprising an opening portion that is cut and formed to have a predetermined angle from an upper end and formed by extending the fluid induction portions formed in the first body portion; and a water level measurement sensor unit which is fixed in the manhole on the outside of the sewage conduit, emits ultrasonic waves toward the opening portion of the second body portion, receives the ultrasonic waves reflected from the water surface, and measures the water level.

The predetermined angle may be 45 degrees to 90 degrees from an upper end of the second body portion to left and right, respectively.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 3 and 4 are cross-sectional views showing the effect of a flow meter for a sewage conduit according to the present invention.

DETAILED DESCRIPTION OF THE PREFERRED EMBODIMENTS

Hereinafter, a preferred embodiment of the present invention will be in detail given with reference to the attached drawings.

Figure 1:
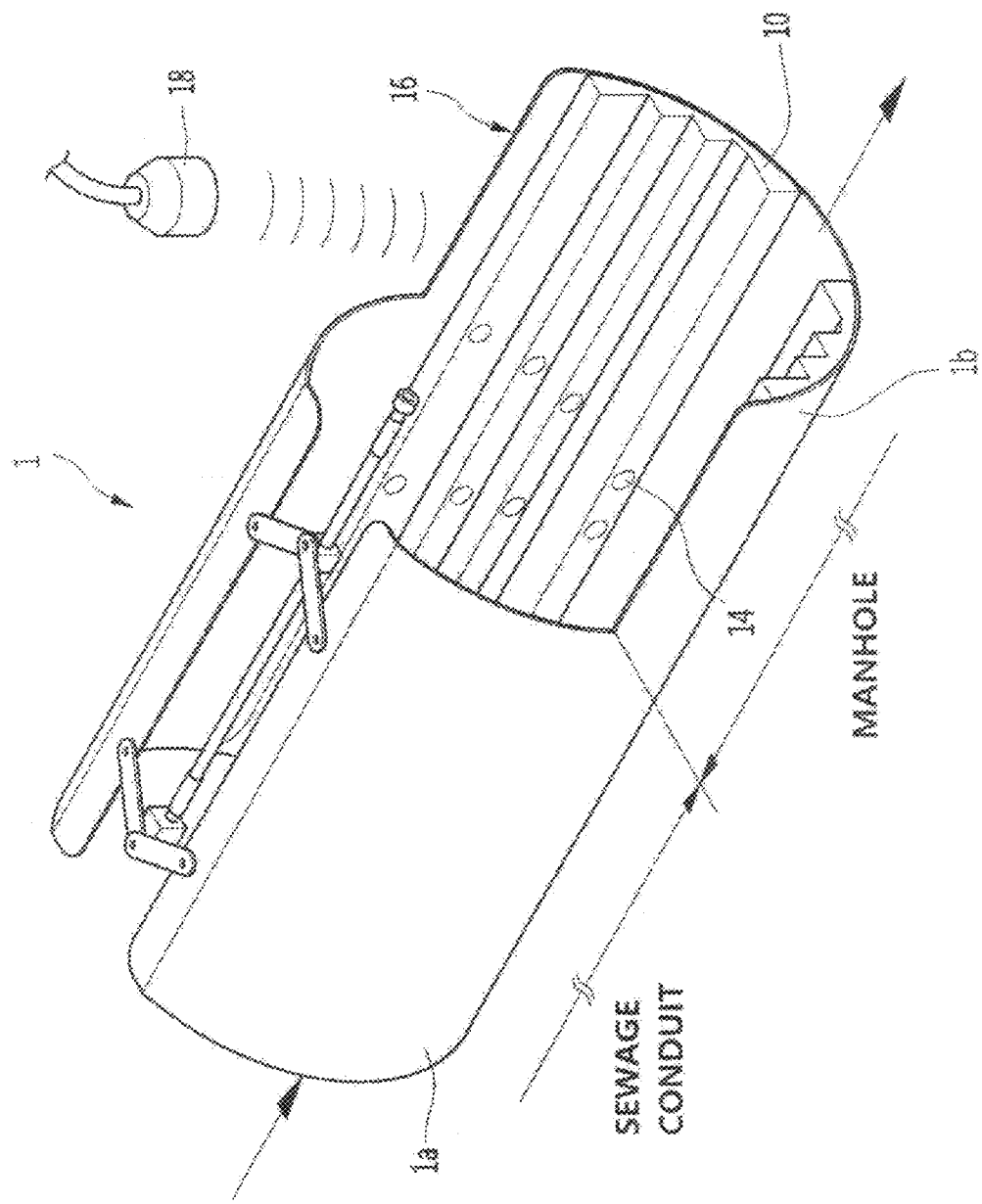
FIG. 1 is a perspective view showing a structure of a flow meter for a sewage conduit according to an embodiment of the present invention.

FIG. 1 is a perspective view showing a structure of a flow meter for a sewage conduit according to an embodiment of the present invention. Referring to FIG. 1, the flow meter 1 for the sewage conduit C according to the present invention includes a first body portion 1a which is a portion inserted into the sewage conduit C, including a plurality of sets of fluid induction portions 10 that are formed to face each other at regular intervals from the lowest water depth close to a bottom surface of the sewage conduit C to less than the highest water depth and protrude along an inner circumferential surface in parallel in the flow direction, and a pair of ultrasonic transducers 14 that are embedded in protruding sides end of the fluid induction portions 10, designed in a V method so that ultrasonic waves emitted from one ultrasonic transducer are reflected by the fluid induction portions 10 facing each other and reach the other ultrasonic transducer, and configured to increase a separation distance from a low water depth to a high water depth, a second body portion 1b, which is a portion exposed to the outside of the sewage conduit C by extending toward a manhole from the first body portion 1a inserted into the sewage conduit C, including an opening portion 16 that is cut and formed to have a predetermined angle from an upper end and formed by extending the fluid induction portions 10 formed in the first body portion 1a and a water level measurement sensor unit 18 which is fixed in the manhole on the outside of the sewage conduit C, emits ultrasonic waves toward the opening portion 16 of the second body portion 1b, receives the ultrasonic waves reflected from the water surface, and measures the water level.

Figure 2:
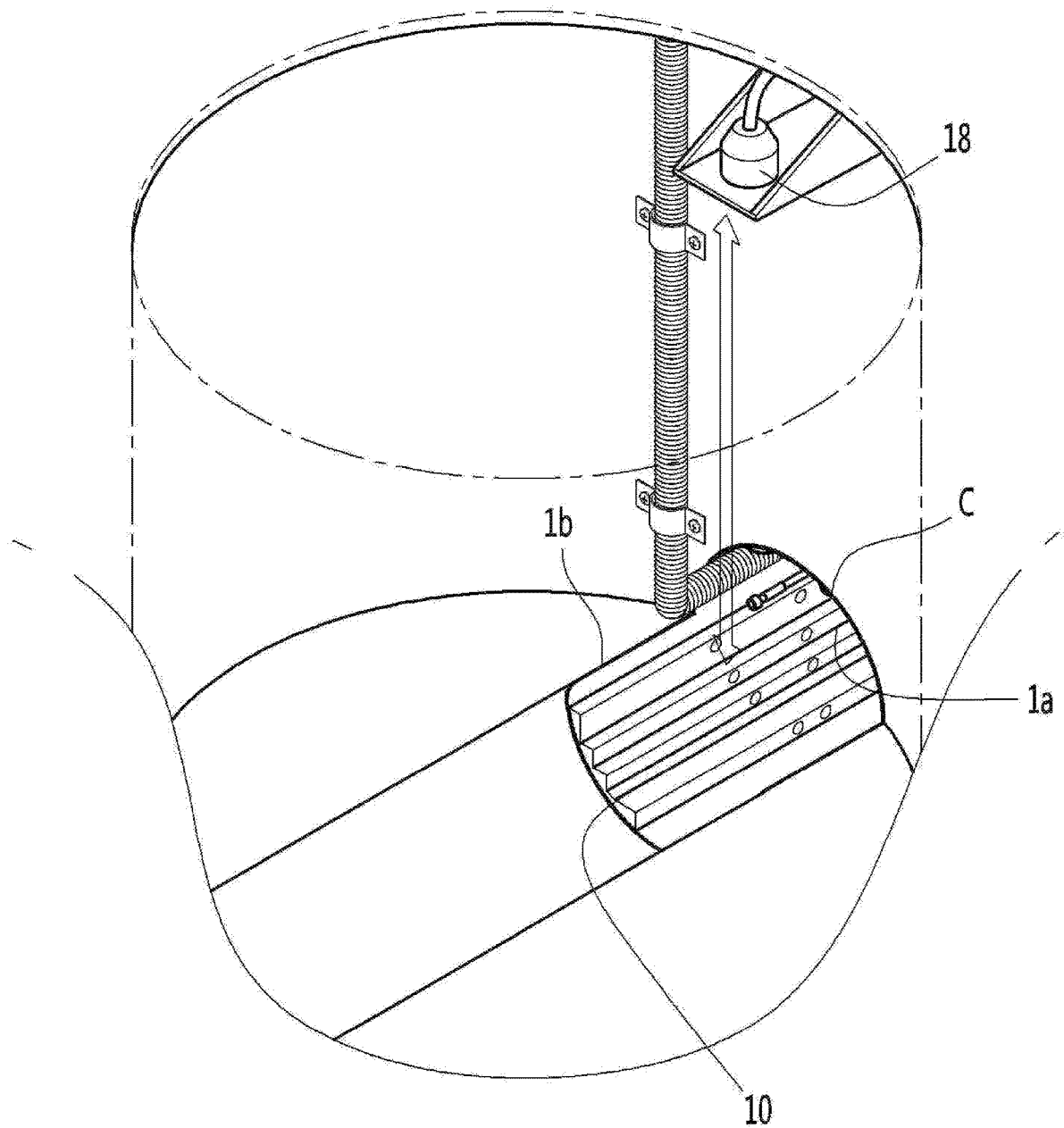
FIG. 2 shows a state in which a flow meter for a sewage conduit according to an embodiment of the present invention is installed in the sewage conduit.

FIG. 2 shows a state in which the flow meter 1 for the sewage conduit C according to an embodiment of the present invention is installed in the sewage conduit. Referring to FIG. 2, in the flow meter 1 for the sewage conduit C, the first body portion 1a including the plurality of sets of fluid induction portions 10 that are formed to face each other at regular intervals from the lowest water depth close to a bottom surface of the sewage conduit C to less than the highest water depth and protrude along an inner circumferential surface in parallel in the flow direction, and the pair of ultrasonic transducers 14 that are embedded in protruding sides end of the fluid induction portions 10, designed in a V method so that ultrasonic waves emitted from one ultrasonic transducer are reflected by the fluid induction portions 10 facing each other and reach the other ultrasonic transducer, and configured to increase a separation distance from a low water depth to a high water depth is inserted into the sewage conduit C.

The second body portion 1b including the opening portion 16 that is cut and formed to have a predetermined angle from an upper end and formed by extending the fluid induction portions 10 formed in the first body portion 1a is exposed to the outside of the sewage conduit C by extending toward a manhole from the first body portion 1a inserted into the sewage conduit C.

The water level measurement sensor unit 18 is fixed in the manhole on the outside of the sewage conduit C, emits ultrasonic waves toward the opening portion 16 of the second body portion 1b, receives the ultrasonic waves reflected from the water surface, and measures the water level.

The effect of the flow meter 1 for the sewage conduit C according to the present invention will be described with reference to FIGS. 3 and 4. Referring to FIG. 3, in the case of the small sewage conduit C with a small diameter, when the flow meter 1 for the sewage conduit C including the plurality of sets of fluid induction portions 10 that are formed to face each other at regular intervals from the lowest water depth close to a bottom surface of the sewage conduit C to less than the highest water depth and protrude along an inner circumferential surface in parallel in the flow direction is installed, due to a difference in a cross-sectional area in a flow direction, the water level in the flow meter 1 rises compared to the water level in the sewage conduit C. That is, as shown in FIG. 4, the water level in the flow meter 1 for the sewage conduit C is relatively high compared to the before/after water level of the flow meter 1 for the sewage conduit C.

In particular, in the case of the small sewage conduit C with the small diameter, since it is difficult to embed a water level sensor together due to space constraints, it is impossible to measure an accurate water level of the flow meter 1.

However, in the flow meter 1 for the sewage conduit C according to the present invention, the first body portion 1a including the plurality of sets of fluid induction portions 10 and the pair of ultrasonic transducers 14 that are embedded in protruding sides end of the fluid induction portions 10 is embedded and installed in the sewage conduit C, the second body portion 1b, which is a portion exposed to the outside of the sewage conduit C by extending toward the manhole from the first body portion 1a inserted into the sewage conduit C, includes the opening portion 16 that is cut and formed to have a predetermined angle from an upper end and is formed by extending the fluid induction portions 10 formed in the first body portion 1a into the opening portion 16 of the second body portion 1b as shown in FIG. 1, and the water level measurement sensor unit 18 is fixed and installed in the manhole on the outside of the sewage conduit C, emits ultrasonic waves toward the opening portion 16 of the second body portion 1b, receives the ultrasonic waves reflected from the water surface, and measures the water level, and thus it is possible to measure the accurate water level of the flow meter 1.

Here, ultrasonic waves from the water level measurement sensor unit 18 is radiated downward, and the radiated ultrasonic waves are reflected from the water surface and received. When a cutting angle of the opening portion 16 that is cut and formed to have a predetermined angle from the upper end is less than 45 degrees from the upper end of the second body portion 1b to left and right, respectively, due to an interference between the ultrasonic waves reflected from the inner surface of the second body portion 1b and incident ultrasonic waves, a signal-to-noise ratio of the water level measurement sensor unit 18 deteriorates, which decreases the accuracy of the water level measurement, and when the cutting angle exceeds 90 degrees, it is not appropriate considering that the fluid induction portions 10 need to be installed to a height corresponding to half the height of a usual measuring apparatus. Accordingly, the cutting angle is preferably between 45 and 90 degrees.

As described above, it is possible to apply a flow meter for a sewage conduit including a plurality of sets of fluid induction portions that are formed to face each other at regular intervals from the lowest water depth close to a bottom surface of the sewage conduit to less than the highest water depth and protrude along an inner circumferential surface in parallel in the flow direction to a small sewage conduit where it is difficult to embed a water level measurement sensor together due to space constraints While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

DESCRIPTION OF REFERENCE NUMERALS

1: flow meter for sewage conduit
C: sewage conduit
10: fluid induction portion
14: ultrasonic transducer
1a: first body portion
1b: second body portion
16: opening portion
18: water level measurement sensor unit
What is claimed is:
1. A flow meter for a small sewage conduit providing water level measurement without error due to a difference in cross-sectional area in a flow within said flow meter, for a sewage conduit comprising:
  a first body portion, which is a portion inserted into the small sewage conduit, having a plurality of sets of fluid induction portions that extend through both the first body portion and a second body portion, the fluid induction portions being formed to face each other at regular intervals from a lowest water depth close to a bottom surface of the small sewage conduit to less than a highest water depth and protrude along an inner circumferential surface in parallel in a flow direction, and a pair of ultrasonic transducers that are embedded in protruding sides end of the fluid induction portions, designed in a V method so that ultrasonic waves emitted from one ultrasonic transducer are reflected by the fluid induction portions facing each other and reach the other ultrasonic transducer, and configured to increase a separation distance from a low water depth to a high water depth;

the second body portion, which is a portion exposed to the outside of the small sewage conduit by extending toward a manhole from the first body portion inserted into the small sewage conduit, having an opening portion that is cut and formed to have a predetermined angle from an upper end and formed by extending the fluid induction portions formed in the first body portion into the opening portion of the second body portion, and the second body portion having predetermined angle at its output that is between 45 degrees to 90 degrees from an upper end of the second body portion to left and right, respectively;

a water level measurement sensor unit which is fixed in the manhole on the outside of the small sewage conduit, emits ultrasonic waves toward the plurality of sets of fluid induction portions in the opening portion of the second body portion, receives the ultrasonic waves reflected from the water surface, and measures the water level; and the small sewage conduit having a small diameter, so that the water level in the flow meter is higher compared to the water level in the sewage conduit due to a reduced cross-sectional area in the flow meter.

2. A device for measuring sewage flow and sewage level a sewage conduit with a small diameter, the device comprising:

said small diameter defined by the sewage conduit having a diameter too small to embed the water level sensor together with the flow sensors in the sewage conduit;

a first body portion, which is a portion inserted into the small sewage conduit, comprising a plurality of sets of fluid induction portions that extend through both the first body portion and a second body portion, the fluid induction portions being formed to face each other at regular intervals from a lowest water depth close to a bottom surface of the small sewage conduit to less than a highest water depth and protrude along an inner circumferential surface in parallel in a flow direction, and a pair of ultrasonic transducers that are embedded in protruding sides end of the fluid induction portions, designed in a V method so that ultrasonic waves emitted from one ultrasonic transducer are reflected by the fluid induction portions facing each other and reach the other ultrasonic transducer, and configured to increase a separation distance from a low water depth to a high water depth;

the second body portion, which is a portion exposed to the outside of the small sewage conduit by extending toward a manhole from the first body portion inserted into the small sewage conduit, and having an opening portion in the second body portion that is cut and formed to have a predetermined angle from an upper end and formed by extending the fluid induction portions formed of the first body portion into the second body portion exposed to the outside of the conduit, and having left and right upper ends extending respectively from the first body portion, the upper ends cut at a predetermined angle between 45 degrees to 90 degrees from an upper end of the second body portion; and a water level measurement sensor unit, which is fixed outside of the small sewage conduit in the manhole, to emit ultrasonic waves toward the plurality of sets of fluid induction portions in the opening portion of the second body portion, the ultrasonic waves reflected from the water surface within the device, back to the water level measurement sensor unit, to measure the water level in the device.

* * * * *